Patented July 14, 1931

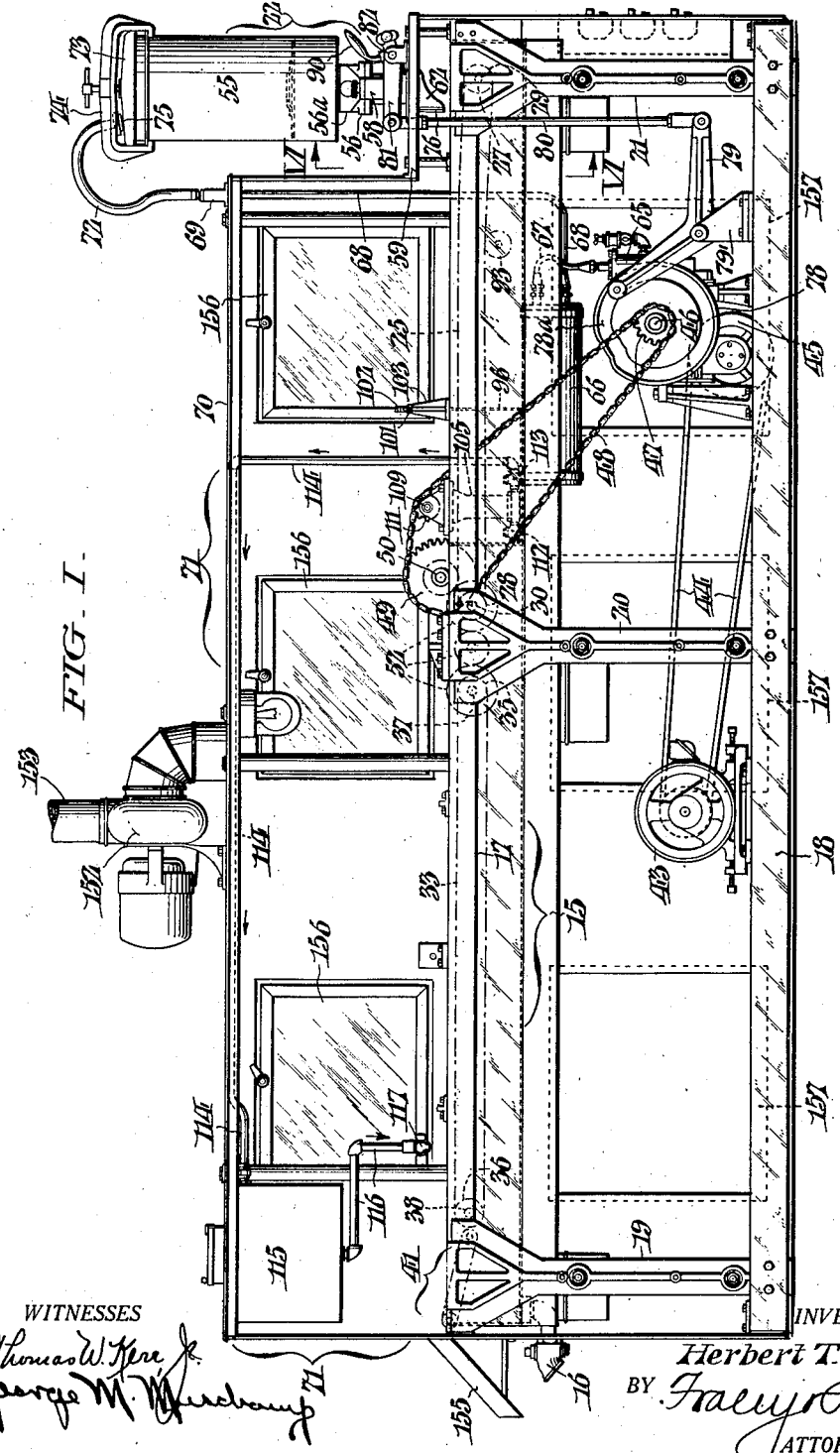

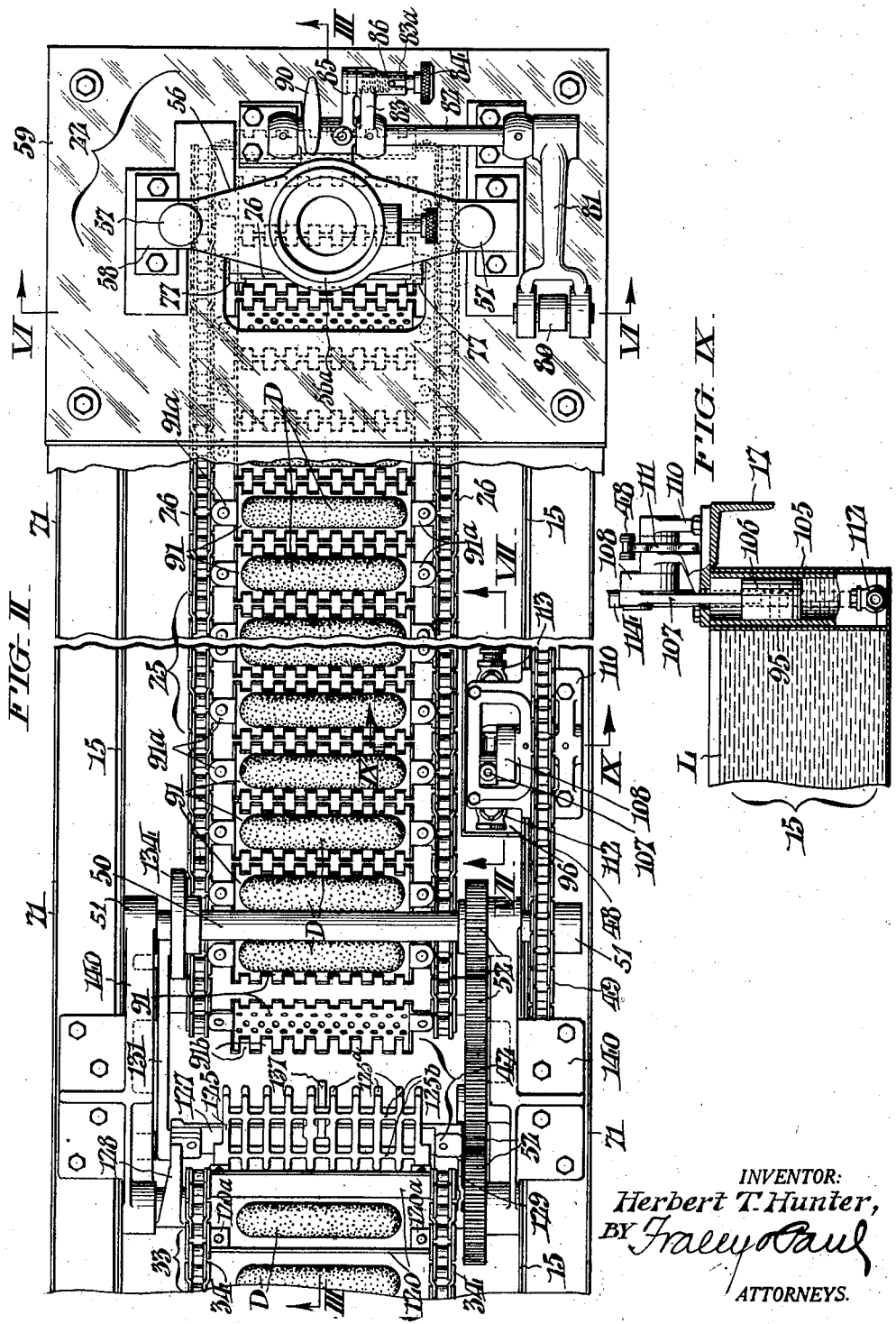

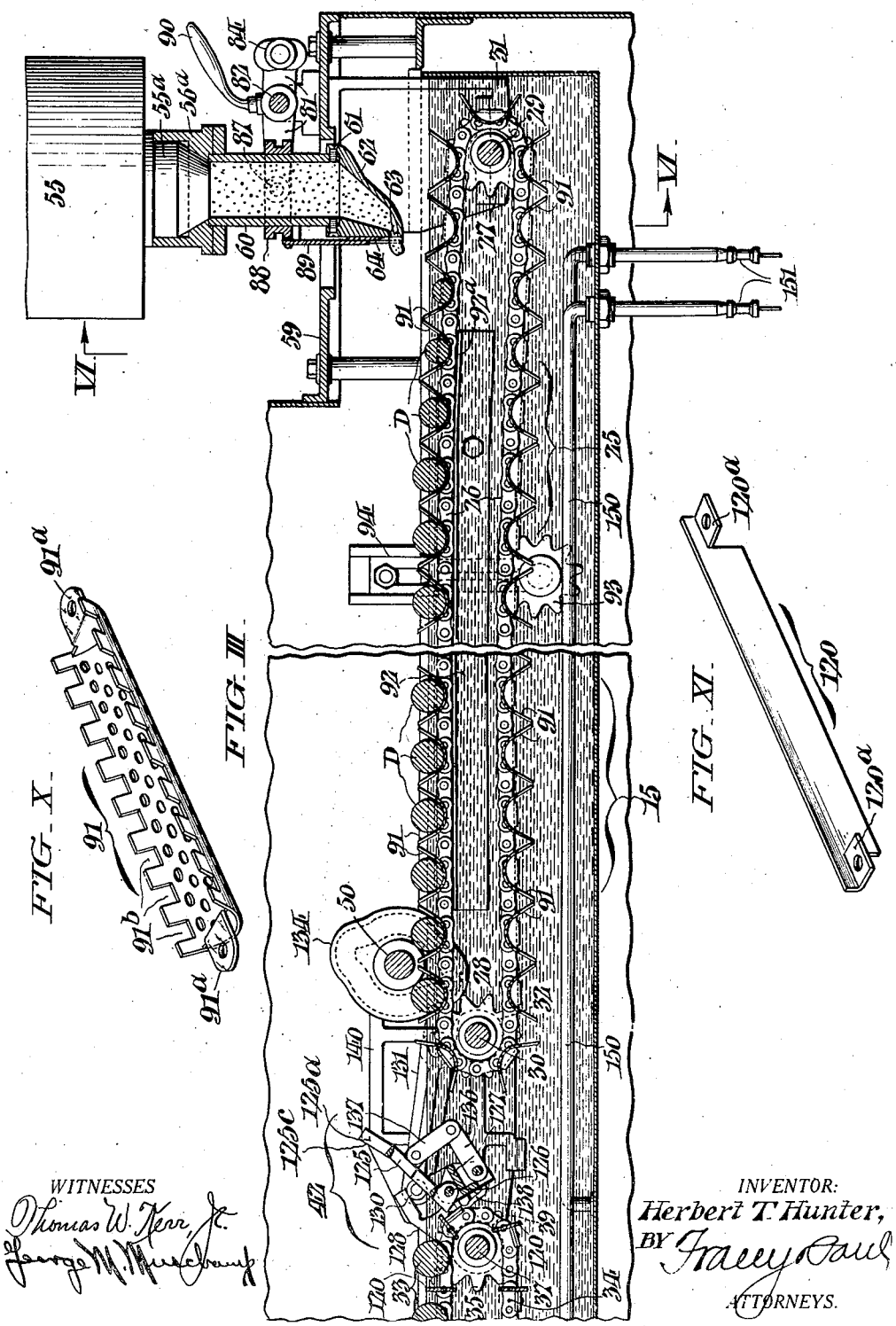

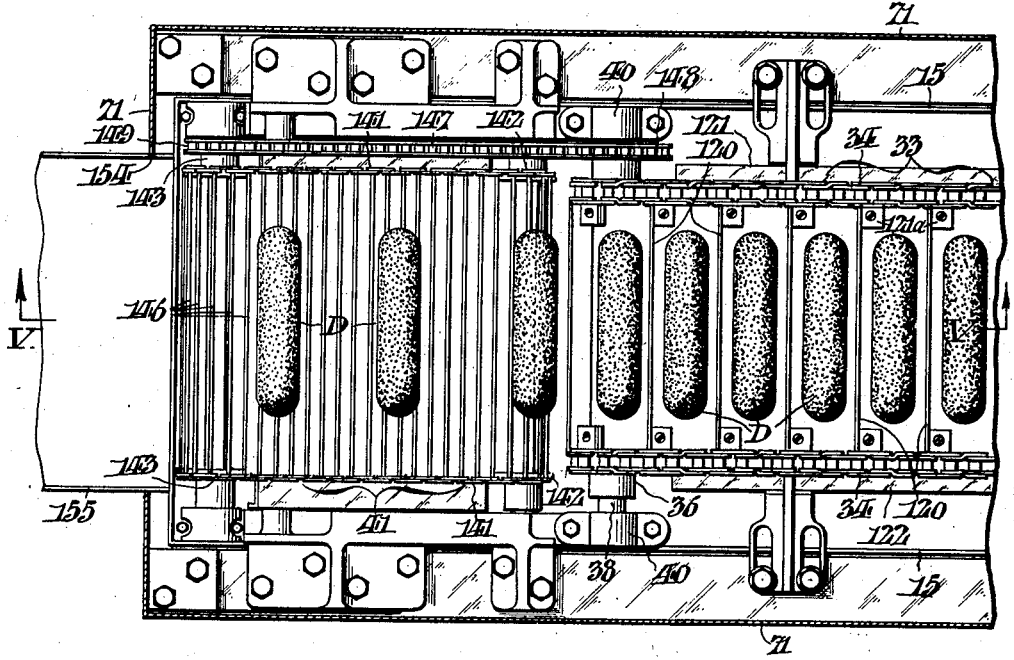
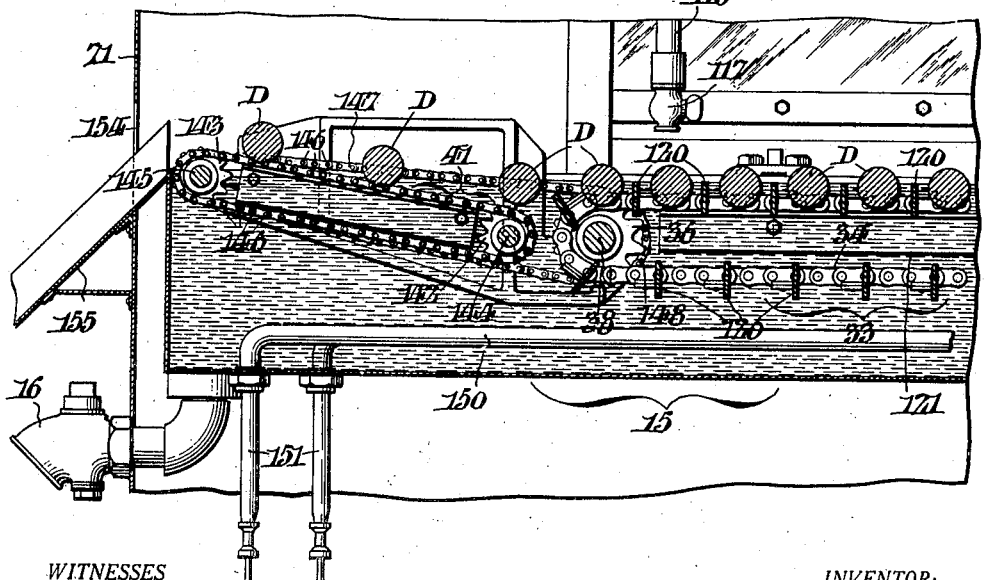

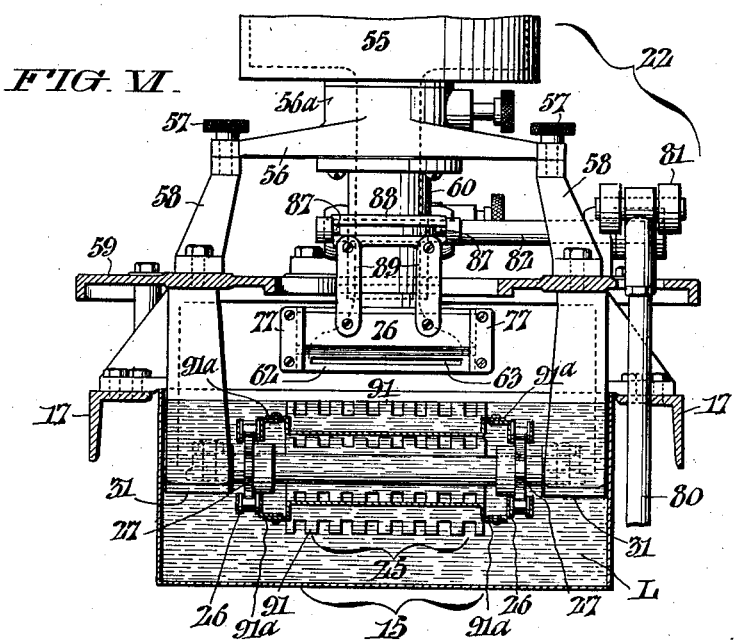

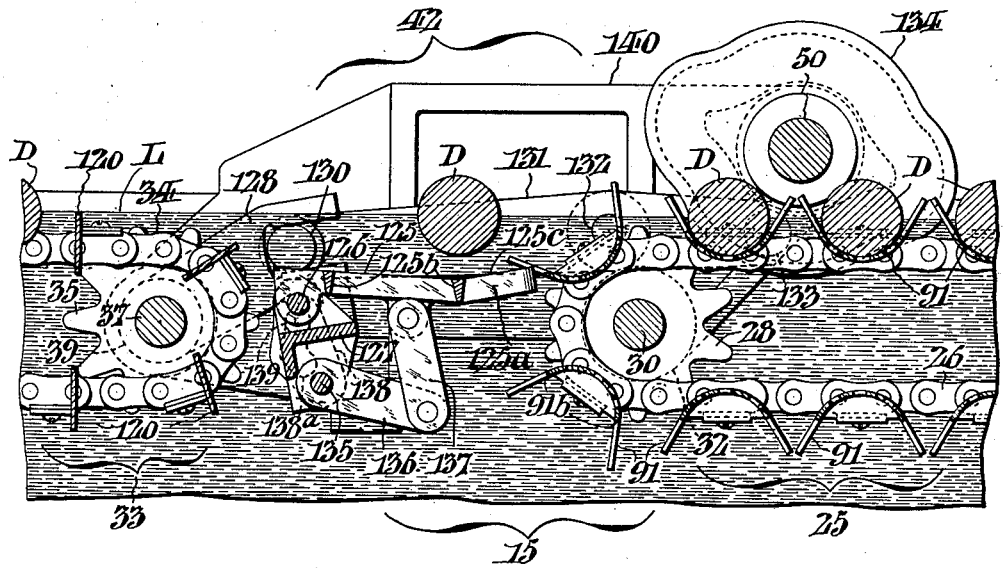

1,814,930

UNITED STATES PATENT OFFICE

HERBERT T. HUNTER, OF CATONSVILLE, MARYLAND, ASSIGNOR TO DOUGHNUT MACHINE CORPORATION, OF NEW YORK, N. Y., A CORPORATION OF NEW YORK

COOKING APPARATUS

Application filed October 10, 1928. Serial No. 311,609.

This invention relates generally to cooking apparatus in which hot liquor is employed as the cooking medium. More specifically, my invention is concerned with apparatus for cooking articles such as doughnuts with hot grease or oil, and more particularly, articles of elongated form like "stick" doughnuts.

In connection with apparatus of the kind referred to, I aim to enable, automatically and under absolutely sanitary conditions, continuous and rapid mass production of doughnuts or similar articles with assurance of uniformity in their size and shape, thorough cooking, and even browning of their surfaces. These ends I secure through provisions, whereby, during the initial stage of the cooking, raw elongated formations of dough or plastic are maintained in definite separation and prevented from turning over incidental to progression at the surface of the cooking liquor until one side is thoroughly cooked and browned; as well as through still other provisions whereby the formations are individually turned over and thereafter conveyed in definite separation, as in the first instance, but free to float in the liquor with the heavier or raw side down, so that during the final stage of the process, such raw side is correspondingly cooked and browned before ejection of the articles from the apparatus.

How the foregoing as well as other important objects and advantages can be readily realized in practice will be manifest from the detailed description which follows of the typical embodiment shown in the attached drawings, wherein Fig. I is a side elevation of my improved cooking apparatus with the near side wall of its protective casing removed to expose parts at the interior to view.

Fig. II is a fragmentary plan view of the receiving end of the apparatus with portions of the casing removed and others in section.

Fig. III is a fragmentary longitudinal sectional view taken as indicated by the arrows III—III in Fig. II.

Fig. IV is a fragmentary plan view of the delivery end of the apparatus.

Fig. V is a fragmentary longitudinal sectional view taken as indicated by the arrows V—V in Fig. IV.

Fig. VI is a fragmentary cross section taken as indicated by the arrows VI—VI in Figs. I, II, and III showing the means whereby the raw articles are formed from dough and released to drop into the cooking liquor.

Fig. VII is a fragmentary detail sectional view taken as indicated by the arrows VII, VII in Fig. II showing pump means whereby the cooking liquor is circulated in the apparatus.

Fig. VIII is a detail sectional view taken as indicated by the arrows VIII—VIII in Fig. VII.

Fix. IX is still another detail section taken as indicated by the arrows IX—IX in Fig. II.

Fig. X is a perspective view showing the type of conveyor pockets employed to progress the articles individually at the surface of the liquor during the initial stage of the cooking.

Fig. XI is a view similar to the preceding showing one of the conveyor vanes by which the articles are progressed afloat in the liquor during the final stage of the cooking.

Figs. XII and XIII are two detail sectional views on a larger scale showing different positions of the means whereby the articles are turned over incidental to transition from one stage of the cooking to the other.

As herein shown, the cooking apparatus of my invention comprises an elongated shallow receptacle 15 for cooking liquor conventionally indicated at L, said receptacle being in the present instance fashioned to elongated rectangular configuration from sheet metal with its bottom sloped slightly so as to drain toward the left hand or delivery end (Fig. I) of the apparatus through a drain cock 16 there provided. The receptacle 15 is suitably supported at a convenient elevation from the floor by a frame embodying upper and lower horizontals 17, 18 and opposite side verticals 19, 20 and 21. Located at the receiving or right hand (Fig. I) end of the apparatus is a means 22 for releasing elongated formations D of dough or plastic to drop horizontally into the cooking liquor L in a position transversely of the receptacle 15. The formations D so released are conveyed along a portion of the receptacle 15 at the level of the liquor L therein in definite separation and under restraint against turning over as hereinafter more fully explained, by a progressing means having the form of a conveyor 25. This conveyor 25 comprises side chains 26, 26, which run over end sprockets 27, 28 that are respectively secured in pairs to transverse shafts 29, 30 having journal support in bearings 31, 32 bolted to the upper horizontals 17 of the machine frame. During the final stage of the cooking, a second progressing means, also in the form of an endless conveyor 33 with side sprocket chains 34, 34 trained about sprockets 35, 36 on transverse shafts 37, 38 likewise journalled in bearings 39, 40 bolted to the upper horizontals 17 of the machine frame, operates to carry the formations D similarly in definite separation but free to float in the liquor L along the remaining portion of the receptacle 15, and to advance said articles to an ejecting means 41, at the left or discharge end of the apparatus. In an intervening interval between the conveyors 25, 33, a device 42 serves as a means to turn over the articles D individually in transferring them from the first conveyor 25 to the second conveyor 33.

The apparatus is driven by an electric motor 43 located in the lower part of the receptacle supporting frame, said motor being connected by a belt 44 with a speed reduction gear device 45 wherefrom power is in turn transmitted to a transverse jack shaft 46. At one end, this jack shaft 46 carries a sprocket pinion 47 which is coordinated by a chain 48 with a sprocket wheel 49 on a transverse shaft 50 extending centrally over the cooking receptacle 15, said shaft having journal support in bearings 51. By a train of gears shown at 52 in Figs. I and II, the motion of the shaft 50 is imparted to the contiguous sprocket shafts 30, 37 of the conveyors 25, 33 so that the latter are continuously driven at a slow synchronized speed.

Referring to Figs. I, II, III and VI, it will be observed that the forming mechanism 22 comprises a dough magazine 55 having a depending axial outlet 55a at the bottom, which outlet is tapered, as shown, to fit the correspondingly configured seat in the central boss 56a of a supporting bridge piece 56. This bridge piece 56 is removably secured by thumb screws 57, at opposite ends, to brackets 58 upstanding from a plate 59 that forms a cover over the receiving end of the receptacle 15. Bolted to the underside of the boss 56a of the bridge piece 56 is a coaxial cylindrical extension neck 60 whereto is in turn secured at the lower end, by screws 61, a rectangular outlet fitting 62 which is disposed transversely of the cooking receptacle 15 and has an elongated lateral horizontally disposed die opening 63 in its vertical face 64 at a level above that of the liquor L in said receptacle. The dough is forced from the magazine 55 by air under pressure generated by a compressing system which includes a pump 65 (Fig. I) adapted to be driven from the speed reduction gear device 45 and delivering into an equalizing tank 66 through a pipe 67. From the equalizing tank 66 the air is conducted, via a pipe 68, to a fitting 69 mounted on the roof 70 of the casing 71 enclosing the apparatus. This fitting 69 affords connection for a flexible tube 72 delivering into the top of the dough magazine 55. As shown in Fig. I, said magazine has a removable cover 73 which is held in place by a yoke clamp 74 and provided with a nipple 75 for coupling of the flexible tube 72. To sever the extrusion from the die outlet 63 in producing the individual formations of raw dough, I provide an intermittently movable cutter blade 76 which is guided at the ends for up and down sliding movement over the frontal face of the feeding, by slideways 77, (Fig. VI). The actuating connections for the cutter blade 76 include a grooved cam 78 (Fig. I) mounted on the jack shaft 46 alongside the sprocket pinion 47. This cam 78 has a face groove 78a to engage a roller on one extremity of a bell crank lever 79 with fulcrum support on a bracket 79′ bolted to one of the lower frame horizontals 18. The other extremity of the bell crank lever 79 is coordinated, by means of a link 80, with an arm 81 fast to a rock shaft 82 which is journalled in bearing lugs upstanding from the cover plate 59 at the receiving end of the machine, see Figs. II and VI also. Pinned to the rock shaft 82 is still another arm 83 carrying in its terminal boss 83a, a clutch pin 84 which is normally urged inwards by a spring to engage an aperture in a cutter operating arm 85 loosely mounted on the shaft 82. By drawing the clutch pin 84 outward and giving it a slight rotation to bring a laterally projecting lug 86 thereof into engagement with the outer face of the boss 83a, said pin is held retracted with the operating arm 85 uncoupled. The forming means 22 can thus be rendered idle without necessity for stopping the apparatus as a whole. The forward extremity of the operating arm 85 is clevised and has inwardly projecting lugs 87 to engage a circumferentially grooved collar 88 which is slidable up and down on the extension neck 60. A pair of straps 89 serve to connect the cutting blade 76 with the collar 88, as shown in Figs. III and VI. By this arrangement it will be seen that with every revolution of the rotary cam 78, the cutter blade 76 will be reciprocated vertically to sever dough extruded through the outlet 63 during a previous period of rest, the size of the extrusions or formations D being regusystem through suitable means not shown. For the purpose of enabling manual operatable by varying the pressure in the air tion of the cutter blade 76 in trials for size, the operating arm 85 is equipped with a handle shown at 90 in Figs. II and III. The extrusions or formations D released by the means 22 in the manner just described, drop horizontally into the liquor L within the cooking receptacle 15 and are received within pockets 91 extending transversely of the side chains 26 of the progressing conveyor 25—the timing of the conveyor and that of said forming means 22 being such that one of the pockets 91 is presented at each operation of said forming means. As shown in Fig. X, the pockets 91 are fashioned to trough configuration from sheet metal and provided at their ends with pierced ears or tabs 91a for attachment to corresponding opposite links of the chains 26, 26 by means of screws or other suitable fastening means. The pockets 91 are moreover perforated as shown to permit free circulation of the cooking liquor L about the formations D accommodated within them, as well as with edge notches 91b at intervals for a purpose hereinafter explained. From Fig. III it is to be particularly noted that the sprocket wheel shaft 29 is somewhat below the level of the sprocket wheel shaft 30, and that guides 92 are provided to support the upper runs of the conveyor chains 26, said guides having an inclined portion at 92a. As a consequence, in moving from the sprocket wheels 27 to the guide 26, the pockets 91 of the conveyor 25 travel upward at a slight inclination. Thus at the point of reception, the bottoms of the pockets 91 are at a level well below the surface of the cooking liquor L so that the fall of the severed extrusions is broken through contact with the liquor L rather than the pockets 91 with avoidance of possible deformation. On the other hand, in moving along the guides 92, the upper run of the conveyor is maintained at a level such that the formations D within the pockets 91 are supported from beneath and thereby held against turning over during the initial stage of the cooking. As a consequence of circulation of the cooking liquor L through the perforations of the pockets 91, the lower halves of the formations D are subjected to the action of said liquor and thereby cooked and browned when they reach the opposite terminus of the conveyor. As a means to maintain the chains 26 of the conveyor 25 taut, I equip the apparatus with idler sprocket pinions 93 which are supported, with capacity for up and down adjustment, by brackets 94 bolted to the top horizontals 17 of the machine frame.

For maintenance of the cooking liquor L at the proper level to prevent floating of the articles D in the conveyor pockets 91 as just described, I provide means as follows: At one side I set apart within the cooking receptacle 15 by means of partitioning walls 95, 95a, a smaller subdivision 96. The wall 95 it will be noted from Fig. VII extends to the top edge of the receptacle 15 but the wall 95a is cut away as at 97 to permit overflow of the cooking liquor L from said receptacle 15 into the auxiliary receptacle 96. With the wall 95a I however associate an adjustable dam member 98 having the form of a plate which is slidable up and down in guides 99 (Fig. VIII), and provided with an opening 100. The position of the dam plate 98 is regulatable by means of a wing nut 101 engaging an upwardly projecting screw 102 which passes through the boss of a bracket 103 supported by the contiguous top rail 17 of the machine frame. By manipulation of the wing nut 101, it will be seen that the dam plate 98 may be raised and lowered to predetermine maintenance of the desired liquid level in the cooking receptacle. Within the auxiliary receptacle 96 is located a pump 105 whereof the piston 106 is reciprocated through a pitman connection 107 with a crank 108 on a shaft 109 supported in bearings of a bracket 110 bolted to one of the top horizontals 17 of the machine frame and overreaching said auxiliary receptacle. The shaft 109 is driven, as shown in Figs. I and VII, through a sprocket pinion 111 engaged with the chain 48 previously referred to. As the piston 106 of the pump 105 moves upward, a check valve 112 permits induction of overflow liquor L from the auxiliary receptacle 96, while during the down or discharge stroke of the piston 106 the valve 112 closes and another check valve 113 opens to permit displacement of the liquor L into a pipe 114 by which said liquor is conducted to a reservoir 115 suitably supported above the cooking receptacle 15 at the left hand or delivery end of the machine, see Fig. I. From this reservoir 115 the liquor gravitates through a drain pipe 116 discharging directly into the cooking receptacle 15, said drain pipe being fitted at its end with a control cock 117 to enable regulation of the flow. Thus, through constant operation of the pump 105, the overflow liquid in the auxiliary receptacle 96 is delivered to the reservoir 115 for discharge into the cooking receptacle 15 for re-use.

As shown in Figs. IV and V, the second conveyor 33 embodies transverse separator vanes 120 preferably made from strip metal by die stamping or otherwise and incidentally formed with end tabs 120a to enable attachment to the side chains 34 at intervals while they may be edge notched after the manner described in connection with attachment of the pockets 91 of the conveyor 25, see Fig. XI also. Through this arrangement, it will be seen that the conveyor 33 affords a succession of individual cells to which the formations D are transferred from the conveyor 25 by the means 42. Upon being transferred to the cells of the conveyor 33 the formations D are unrestrained, that is to say, they float free in the liquor L during slow progression along the remaining portion of the cooking receptacle 15 enroute to the ejector means at 41. Owing to the extent of the span between the sprockets 37, 38, the upper run of the conveyor 33 is given additional support by angle bars 121, 122 adapted to be overtravelled by its side chains 34.

The means 42 instrumental in individually transferring the formations D from the pockets 91 of the conveyor 25 to the cells between vanes 120 of the conveyor 33, comprises a hand 125 which normally lies submerged in the cooking liquor L within the receptacle 15 as illustrated in Fig. XII, but which, upon being actuated, is raised to the position shown in Figs. III and XIII. To avoid splashing of the liquor L the hand 125 is preferably formed as an open structure, i. e. with a number of laterally spaced fingers 125a which are integrally joined by parallel cross bars 125b, see Fig. II, and have their ends sloped upwardly somewhat as at 125c. The hand 125 is mounted for swinging movement about a fulcrum shaft 126 supported by a cross piece 127 joining two arms 128, 129, (Figs. II, XII and XIII), which are in turn fulcrumed for swinging movement outward of the sprockets 35 of the conveyor 33 on the shaft 37. The arm 128 is bifurcated to engage a roller 130 on one extremity of a lever 131 which is pivoted intermediate its ends on a fixed axis 132. A roller 133 on the opposite extremity of the lever 131 engages a side grooved rotary actuating cam 134, the latter being mounted on the shaft 50 with the sprocket wheel 49 hereinbefore mentioned, see Fig. II. By reference again to Figs. XII and XIII it will be observed that, below the shaft 126, the cross piece 127 joining the arms 128, 129 affords bearing for another shaft 135 with an attached arm 136 which is coupled, by a link 137, with the hand 125. Affixed to the far end of the shaft 135 (as considered in Figs. XII and XIII) is a slotted cam piece 138 that engages a fixed stud 139 projecting laterally from a bracket 140 which affords the bearings 32, 39 at the corresponding side of the cooking receptacle 15. The slot 138a of this cam piece 138 is curved and terminates in an offset, the curvature lying normally concentric with the axis of the sprocket shaft 37 as shown in Fig. XII. By virtue of this construction, it is manifest that with inception of the actuation of the mechanism 42 under control of the rotary cam 134, the hand 135 will respond solely to the dictates of the upwardly moving arms 128, 129, said hand swinging therefore about the axis 37 as a center. Incidental to such swinging, the fingers 125a of the hand 125 sweep crosswise through the notches 91a of each conveyor pocket 91 as it moves downwardly around the tops of the sprockets 28. The corresponding formation D released at the time by the conveyor 25 is engaged from beneath after a manner obvious from Fig. XII. In this connection, it is important to note that the slopes of the hand fingers 125a at 125c tends to impel the delivered formation D toward the left in Fig. XII, or in other words, prevents retrogression of such formation D back into the conveyor pocket 91 previously occupied. As the action proceeds, the delivered formation D is lifted from the liquor L, and when the notched portion of the slot 138a of the cam piece 138 finally encounters the stud 139, the hand 125 is given a sudden flip forwardly about the axis 126 and independently of the arms 128, 129. As a result the formation D is turned over and deposited with the raw side down into that cell of the second conveyor 33 at the time immediately in advance of the vane 120 just rounding the top of the sprockets 35, see Fig. XIII. The groove of the rotary cam 134 has two offsets in diametrically opposed relation, but since the speed of its rotation is just one-half that of the jack shaft 48 which carries the rotary cam 78 for actuating the forming and releasing means 22 (the ratio of the sprockets 47, 49, see Fig. I, being two to one), it follows that a formation D is transferred from the conveyor 25 to the conveyor 33 for each new raw formation D released into the receptacle 15.

Referring again to Figs. IV and V it will be seen that the ejecting means 41 is also in the form of an endless conveyor with side chains 141 running about sprockets 142, 143 supported on shafts 144, 145, said shafts being disposed at different levels so as to determine upward travel of the chains 141 thereby to elevate the cooked formations D delivered by the conveyor 33 for discharge from the apparatus. The supporting surface of the ejecting conveyor 41 is constituted by a multiplicity of rods 146 extending transversely between the side chains 141, the open construction permitting drainage of all excess cooking liquor L carried along by the formations D back into the receptacle 15 before actual ejection from the apparatus. The ejector conveyor 41 is driven by means of a sprocket chain 147 coordinating wheels 148, 149 respectively on the sprocket shaft 38 of the progressing conveyor 33 and the shaft 145. The ratio between the wheels 148, 149 is such that the ejecting conveyor 41 is operated at a surface speed considerably faster than that of the progressing conveyor 33, thereby facilitating and insuring lifting of the formations D from the cooking liquor.

Any suitable means may be employed to heat the liquor in the receptacle 15, for example, electric coils 150 sheathed within protective tubing and disposed along the bottom of said receptacle beneath the conveyors 25, 33. As shown in Figs. III and V, the terminals 151 of these coils extend down through the bottom of the receptacle 15 to enable making of the necessary external circuit connections.

The fumes collecting within the casing 71 are drawn off by means of an electrically driven exhaust fan 152 which is supported on the roof 70 and discharges into a connecting flue pipe 153. At the delivery end of the machine, the casing 71 has an opening 154 at the level of the upper end of the ejecting conveyor 41; and a chute 155 is provided for conducting the ejected articles into a suitable receptacle not shown. The casing 71 is furthermore provided in its upper portion with windows 156 through which the behavior of the apparatus may be readily observed, and in the lower portion with hinged doors 157 permitting access to the machinery within the compartment beneath the cooking receptacle 15.

In the operation of the apparatus, the raw formations D successively released by the means 22, are received individually within the pockets 91 of the continuously moving conveyor 25, thereby carried in definite separation along the receptacle 15 at the surface of the cooking liquor L while supported against their buoyancy, from turning over,— the overflow dam 98 having previously been adjusted to maintain the liquor level at the proper height to predetermine the described condition for formations B uniformly of one size, that is to say, of the same diameter. If the size of the raw formations D is either increased or decreased by varying the air pressure maintained on the dough in the magazine 55, corresponding adjustments of the dam 98 are of course made to bring the liquor level up or down so as to prevent floating of the formations D in the conveyor pockets 91 during the initial stage of the cooking process. By the time the formations D are delivered to the transfer means 42 they are thoroughly cooked and browned on the bottom side as a consequence of circulation of the cooking liquor L through the apertures in the pockets 91 of the conveyor 25 during transit. In being transferred individually after the manner already understood, the half cooked formations D are positively turned over and deposited within the cells between the vanes 120 of the second synchronously moving conveyor 33 raw side down to be further carried along in the liquor L but now free of restraint and afloat with assurance that complete cooking and browning is accomplished when they finally reach the conveyor means 41 for ejection through the discharge opening 154 of the casing 71. The apparatus of my invention is thus conducive to mass production, automatically, of stick doughnuts or the like under absolutely sanitary conditions.

Having thus described my invention, I claim:

1. In apparatus for cooking articles such as stick doughnuts with hot cooking liquor, a receptacle for the cooking liquor with means for longitudinally progressing the articles at the surface of the liquor in individually separated relation, an auxiliary receptacle receiving overflow of the liquor from the cooking receptacle, and pump means continuously drawing the overflow liquor from the auxiliary receptacle for reintroduction into the cooking receptacle.

2. In apparatus for cooking articles such as doughnuts with hot cooking liquor, a receptacle for the cooking liquor with means for progressing the articles therein, an auxiliary receptacle receiving overflow of the liquor from the cooking receptacle, pump means continuously drawing the overflow liquor from the auxiliary receptacles for reintroduction into the cooking receptacle and adjustable dam means between the auxiliary receptacle and the cooking receptacle to regulate the liquor level in the latter receptacle.

3. In apparatus for cooking articles such as doughnuts with hot cooking liquor, a receptacle for the cooking liquor with means for progressing the articles therein, a gravity flow reservoir with regulatable means continuously discharging cooking liquor into the receptacle, an auxiliary receptacle receiving overflow of the liquor from the cooking receptacle, and pump means continuously drawing the overflow liquor from the auxiliary receptacle for delivery into the gravity flow reservoir aforesaid.

4. In apparatus for cooking articles such as stick doughnuts with hot cooking liquor, a receptacle for the cooking liquor, supporting conveyor means for progressing articles at the surface of the liquor in the receptacle during the initial stage of the cooking, and an adjustable overflow dam enabling regulation of the liquid level in said receptacle relative to that of the conveyor means to prevent floating and turning over of the articles progressed by the latter.

5. In apparatus for cooking articles such as stick doughnuts with hot cooking liquor, a receptacle for the cooking liquor, a conveyor with individual pockets to maintain the articles definitely separated incidental to progression at the surface of the liquor in the receptacle during the initial stage of the cooking, and an adjustable overflow dam enabling regulation of the liquor level in the receptacle to prevent floating and turning over of the articles in the pockets of the conveyor.

6. In apparatus for cooking articles such as stick doughnuts with hot cooking liquor, an elongated receptacle for the cooking liquor, means at one end of the receptacle for releasing raw elongated formations of dough to drop horizontally into the cooking liquor, a continuously moving conveyor with perforate pockets to receive the formations individually and to maintain them in definite separation and against turning over incidental to longitudinal progression part way of the length of the receptacle and at the surface of the liquor, a second continuously moving synchronized conveyor affording individual cells to progress the articles in definite separation afloat in the liquor along the remaining portion of the receptacle, means receiving the articles individually from the pockets of the first conveyor and transferring them into the cells of the second conveyor, and coordinated drive means to intermittently actuate the forming and releasing means and the transfer means in definite co-relation with progression of the conveyors so that an article is transferred for each raw formation released by the forming means.

7. In apparatus for cooking articles such as stick doughnuts with hot cooking liquor, an elongated receptacle for the cooking liquor, a conveyor with transversely arranged pockets to individually support raw formations while maintaining them in definite separation and against turning over incidental to progression at the surface of the liquor part way of the length of the receptacle, a second synchronized conveyor affording transversely arranged cells for individual progression of the formations afloat in the liquor along the remaining portion of the receptacle, and means receiving the half cooked formations individually from the first conveyor and transferring them inverted with the raw side down into the cells of the second conveyor.

8. In apparatus for cooking articles such as stick doughnuts with hot cooking liquor, an elongated receptacle for the cooking liquor, a conveyor with transversely arranged pockets to individually support raw formations while maintaining them in definite separation and against turning over incidental to progression at the surface of the liquor part way of the length of the receptacle, a second synchronized conveyor affording transversely arranged cells for individual progression of the formations afloat in the liquor along the remaining portion of the receptacle, and means intermediate the conveyors receiving the formations individually from the first conveyor and transferring them to the second, said means including a pivoted lifting hand normally lying submerged in the liquor and adapted to engage the formations from beneath upon release of each from the corresponding pocket of the first conveyor, said hand having an inclination at the free end functional in preventing retrogression of a released formation back into the vacated conveyor pocket during engagement as aforesaid.

9. In apparatus for cooking articles such as stick doughnuts with hot cooking liquor, an elongated receptacle for the cooking liquor, a horizontal conveyor running over end sprockets and having transversely arranged pockets to individually support raw formations while maintaining them in definite separation and against turning over incidental to longitudinal progression at the surface of the liquor, part way of the length of the receptacle, a second synchronized horizontal conveyor affording individual transverse cells to progress the articles in definite separation afloat in the remaining portion of the receptacle; and means located intermediate the conveyors for receiving the formations individually from the first and transferring them to the cells of the second, said means including an intermittently actuated pivoted lifting hand normally lying submerged in the liquor, and having laterally-spaced fingers adapted to sweep upward through edge clearance notches in the pockets of the first conveyor as the latter round the sprocket at the delivery end in engaging beneath the articles successively released for transfer.

10. In apparatus for cooking articles such as stick doughnuts with hot cooking liquor, an elongated receptacle for the cooking liquor, a conveyor with transversely arranged pockets to individually support raw formations while maintaining them in definite separation and against turning over incidental to progression at the surface of the liquor part way of the length of the receptacle, a second synchronized conveyor affording transversely arranged cells for individual progression of the formations afloat in the liquor along the remaining portion of the receptacle, and means intermediate the conveyors receiving the formations individually from the first conveyor and transferring them to the second, said means including a hand, a pivoted member sustaining the hand with capacity for independent swinging, means for intermittently actuating the support to effect lifting of the formations from the liquor, and instrumentalities for independently swinging the hand forward subsequently relative to the member aforesaid with rapid flipping movement to insure deposit of the formations into the cells of the second conveyor raw side down.

11. In apparatus for cooking cylindrical unstable articles such as stick doughnuts in hot liquor, a receptacle for the cooking liquor, and a conveyor with perforate trough-like pockets, said pockets having semi-cylindric bottoms and outwardly flaring sides for maintaining the doughnuts definitely separated while supporting them against their buoyancy at the surface of the liquor positioned cross-wise of the receptacle to prevent them from rolling during the initial stage of cooking.

12. In apparatus for cooking cylindrical unstable articles such as stick doughnuts in hot liquor, a receptacle for the cooking liquor, and a conveyor with transversely arranged pockets for maintaining the doughnuts definitely separated while supporting them against their buoyancy at the surface of the liquor to prevent them from rolling during the initial stage of cooking, said pockets having semi-cylindric bottoms and outwardly flaring straight sides and being fashioned from sheet metal with perforations permitting penetration by the cooking liquor.

13. Apparatus for cooking stick doughnuts in hot liquor comprising a receptacle for the cooking liquor, a conveyor with pockets having semi-cylindric bottoms and outwardly flaring straight sides for individually receiving and supporting at the surface of the liquor doughnuts dropped horizontally into the receptacle from above, and means for progressing the conveyor.

In testimony whereof, I have hereunto signed my name at Ellicott City, Maryland this 29th day of September, 1928.

HERBERT T. HUNTER.